US009523417B2

United States Patent
Nakagawa et al.

(10) Patent No.: US 9,523,417 B2
(45) Date of Patent: Dec. 20, 2016

(54) VEHICLE POWER TRANSMISSION DEVICE

(71) Applicant: TOYOTA JIDOSHA KABUSHIKI KAISHA, Toyota-shi, Aichi-ken (JP)

(72) Inventors: Hideki Nakagawa, Toyota (JP); Michio Yoshida, Susono (JP); Hirofumi Nakada, Toyota (JP); Ryoji Habuchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/399,072

(22) PCT Filed: May 23, 2013

(86) PCT No.: PCT/JP2013/064312
§ 371 (c)(1),
(2) Date: Nov. 5, 2014

(87) PCT Pub. No.: WO2013/176208
PCT Pub. Date: Nov. 28, 2013

(65) Prior Publication Data
US 2015/0087463 A1 Mar. 26, 2015

(30) Foreign Application Priority Data

May 23, 2012 (WO) ............... PCT/JP2012/063173

(51) Int. Cl.
*F16H 37/02* (2006.01)
(52) U.S. Cl.
CPC ....... *F16H 37/022* (2013.01); *F16H 2037/026* (2013.01); *F16H 2200/0008* (2013.01);
(Continued)

(58) Field of Classification Search
None
See application file for complete search history.

(56) References Cited

U.S. PATENT DOCUMENTS 5,853,343 A * 12/1998 Eggert ............... F16H 37/022
475/210
2004/0106488 A1 6/2004 Sato et al.
(Continued)

FOREIGN PATENT DOCUMENTS

| JP | H09-025942 A | 1/1997 |
| JP | A-2000-130548 | 5/2000 |

(Continued)

*Primary Examiner* — Colby M Hansen
(74) *Attorney, Agent, or Firm* — Oliff PLC

(57) ABSTRACT

There is a vehicle power transmission device in which a continuously variable transmission and a gear train are provided between an input shaft and an output shaft so as to be able to transmit torque between the input shaft and the output shaft, the gear train has at least one speed ratio that cannot be set by the continuously variable transmission. In the vehicle power transmission device, a forward-reverse switching mechanism is arranged along the same axis as an axis of the input shaft, a first clutch mechanism and a brake mechanism are provided, a second clutch mechanism is provided in a first torque transmission path that is routed from the input shaft to the output shaft via the continuously variable transmission, a third clutch mechanism is provided in a second torque transmission path that is routed from the output element to the output shaft via the gear train.

15 Claims, 10 Drawing Sheets

(52) U.S. Cl.
CPC ............... *F16H 2200/2005* (2013.01); *F16H 2200/2035* (2013.01)

(56) References Cited

U.S. PATENT DOCUMENTS

| | | |
|---|---|---|
| 2008/0236917 A1 | 10/2008 | Abe et al. |
| 2011/0230298 A1* | 9/2011 | Salamandra .......... F16H 37/046 475/207 |

FOREIGN PATENT DOCUMENTS

| | | |
|---|---|---|
| JP | A-2002-48213 | 2/2002 |
| JP | 2002-188695 A | 7/2002 |
| JP | A-2004-76876 | 3/2004 |
| JP | 2004-176890 A | 6/2004 |
| JP | A-2005-308041 | 11/2005 |
| JP | 2007-270923 A | 10/2007 |
| JP | 2008-144904 A | 6/2008 |

* cited by examiner

|  | C1 | C2 | C3 | B |
|---|---|---|---|---|
| START MOVING | ON | OFF | ON | OFF |
| FORWARD TRAVELING | OFF | ON | (ON) | OFF |
| BACKWARD TRAVELING | OFF | OFF | ON | ON |

VEHICLE POWER TRANSMISSION DEVICE

TECHNICAL FIELD

The invention relates to a device for transmitting power output from a driving force source of a vehicle and, more particularly, to a power transmission device that includes a transmission path including a continuously variable transmission and another transmission path provided in parallel with the former transmission path.

BACKGROUND ART

An internal combustion engine that is generally used as a driving force source of a vehicle has such a characteristic that an output torque increases with an increase in rotation speed, whereas a driving force that is required of a vehicle is generally large at a low vehicle speed and is relatively small at a high vehicle speed. That is, a vehicle requires a torque having an inverse characteristic to a torque based on the output characteristic of the internal combustion engine. In addition, an operating point at which the efficiency of the internal combustion engine is high is limited. Therefore, in a vehicle that uses the internal combustion engine as a driving force source, a transmission that is able to change its speed ratio as needed is mounted, and the speed ratio is set as needed on the basis of a traveling state of the vehicle, such as a vehicle speed and an accelerator operation amount. Thus, a required driving force is obtained, and the internal combustion engine is operated at an operating point having a high efficiency. In addition, when there is a step between speed ratios, if an operating point having a high thermal efficiency is at a rotation speed that can be set at a speed ratio between those speed ratios, thermal efficiency (or fuel economy) deteriorates in an operating state during a period of a change from one of the speed ratios to the other one of the speed ratios. Therefore, recently, a continuously variable transmission is used instead of a stepped transmission.

A belt-type continuously variable transmission and a toroidal-type continuously variable transmission are widely known as a continuously variable transmission for a vehicle. The former belt-type continuously variable transmission includes a pair of pulleys, each of which increases or reduces the winding radius of a belt by changing the width of a groove in which the belt is wound. The belt-type continuously variable transmission is configured as follows. The winding radius of the belt is reduced by increasing the groove width of one of the pulleys, and the winding radius of the other one of the pulleys is reduced accordingly to cause the winding radius of the belt to increase. The latter toroidal-type continuously variable transmission is configured as follows. Power rollers are sandwiched between a pair of opposed discs. When a line connecting contact points of each power roller with the respective discs is inclined with respect to a rotation central axis of each disc, a difference in rotation speed between the discs arises. As the inclined angle (tilt angle) increases, the difference in rotation speed between the discs, that is, a speed ratio, deviates from "1".

In these continuously variable transmissions, in order to be able to continuously change the speed ratio, torque is transmitted by utilizing friction force between each pulley and the belt or friction force between each disc and each power roller. Because a friction force is the product of a friction coefficient at a contact point of two members and a normal load (or a load in the normal direction), the normal load is increased with a torque to be transmitted. In the belt-type continuously variable transmission for a vehicle, the normal load is a load by which each pulley clamps the belt. For example, a hydraulic actuator is integrally formed with each pulley, and the load is generated by hydraulic pressure that is supplied to each hydraulic actuator.

On the other, hand, a large driving force is required at the start of the vehicle, whereas a driving force that is required in a steady traveling state, that is, during cruising, is smaller than that at the start of the vehicle. Therefore, it is required to increase the normal load for generating the above-described friction force at the start of the vehicle, and a hydraulic pressure for generating a clamping force is increased at the start of the vehicle in the belt-type continuously variable transmission. If a hydraulic device that generates a large hydraulic pressure, is provided in preparation for a start-moving time that is a relatively short time as a driving state of the vehicle, a driving device and a hydraulic system for the driving device increase in size, and there is a possibility that fuel economy deteriorates as the hydraulic device generates a high hydraulic pressure.

A device that is able to eliminate such an inconvenience is described in Japanese Patent Application Publication No. 2005-308041 (JP 2005-308041 A), Japanese Patent Application Publication No. 2004-076876 (JP 2004-076876 A), Japanese Patent Application Publication No. 2000-130548 (JP 2000-130548 A), or the like. Of these, in the device described in JP 2005-308041 A, power output from an engine is transmitted to a sun gear of a single-pinion-type planetary gear train that constitutes a forward-reverse switching mechanism, and a clutch is provided to couple the sun gear to an input shaft integrated with a primary pulley of the belt-type continuously variable transmission. An input gear is fitted to an outer peripheral side of the input shaft via a one-way clutch. The input gear is coupled to a ring gear in the forward-reverse switching mechanism. The one-way clutch is configured to be engaged when the input shaft rotates at a higher speed than the outer peripheral-side input gear in a forward rotation direction. An output gear is fitted via another one-way clutch to an outer peripheral side of an output shaft integrated with a secondary pulley. An idle gear is arranged between the input gear and the output gear. The input gear and the output gear are in mesh with the idle gear. That is, the input gear and the output gear both are configured to rotate in the same direction. A gear ratio (speed ratio) between these input gear and output gear is set to a speed ratio slightly smaller than the largest speed ratio that can be set by the continuously variable transmission formed of the pulleys and the belt wound around these pulleys. The other one-way clutch is configured to be engaged when the output shaft rotates at a higher speed than the output gear in the forward rotation direction. A friction clutch is provided in parallel with the other one-way clutch. In addition, in order to set a backward traveling state, a brake that fixes a carrier in the forward-reverse switching mechanism is provided.

Thus, in the device described in JP 2005-308041 A, for example, when the vehicle starts moving in order to travel forward, the sun gear and the input shaft are coupled to each other by the clutch, torque is transmitted via the input shaft to a main shift path mainly formed of the continuously variable transmission, and torque is transmitted by engaging the one-way clutch with an auxiliary shift path mainly formed of the above-described gears. In this case, because the speed ratio of the gear train is slightly smaller than the maximum speed ratio of the continuously variable transmission, the output gear rotates at a higher speed than the output shaft, the output shaft-side one-way clutch enters a released state, and torque is transmitted to drive wheels via the gear train. That is, large torque at the start of the vehicle is not applied to the continuously variable transmission. After the vehicle starts moving, when the speed ratio of the continuously variable transmission is gradually reduced with an increase in vehicle speed, the rotation speed of the output shaft integrated with the secondary pulley reaches the rotation speed of the output gear provided on the outer peripheral side of the output shaft, and the rotation speed of the output shaft further increases as a result of a reduction in speed ratio. As a result, the output shaft-side one-way clutch enters an engaged state, and torque is transmitted to the drive wheels via the continuously variable transmission. In this case, because the input shaft-side one-way clutch enters a released state, no interlocking state occurs.

In the device described in JP 2004-076876 A, a forward-reverse switching mechanism formed of a single-pinion-type planetary gear train is provided between an input shaft that transmits power output from an engine and a primary pulley in a belt-type continuously variable transmission, a ring gear in the forward-reverse switching mechanism is coupled to the primary pulley so as to integrally rotate with the primary pulley, and the input shaft is coupled to a sun gear. Thus, a forward traveling state is established by coupling the sun gear and the ring gear to each other by a clutch, and a backward traveling state is established by fixing a carrier by a brake. In addition, a gear train having a speed ratio larger than the maximum speed ratio of the continuously variable transmission is provided between the input shaft and an output shaft integrated with a secondary pulley, an input gear that constitutes the gear train is integrated with the input shaft, an output gear coupled to the input shaft via an idle gear is rotatably fitted to the output shaft, and a one-way clutch and a friction clutch are arranged in series between the output gear and the output shaft.

Thus, in the case where the vehicle starts moving in the forward traveling state, when the clutch for coupling the input shaft to the primary pulley is released and the output shaft-side clutch is engaged, torque is transmitted from the input shaft to the output shaft via the gear train, the one-way clutch and the clutch arranged in series with these gear train and one-way clutch. When the input shaft and the primary pulley are coupled to each other by the clutch from this state, because the maximum speed ratio of the continuously variable transmission is slightly smaller than the speed ratio of the gear train, the secondary pulley and the output shaft integrated with the secondary pulley rotate at a rotation speed higher than before, more specifically, a higher rotation speed than the output gear, so the one-way clutch is released. That is, torque is transmitted to the output shaft via the continuously variable transmission. In this way, because the gear train transmits torque at the start of the vehicle, large torque at the start of the vehicle is not applied to the continuously variable transmission.

JP 2000-130548 A describes a transmission device configured as in the case of the above-described device described in JP 2004-076876 A. In the transmission device described in JP 2000-130548 A as well, a one-way clutch and a friction clutch are arranged in parallel between an output-side gear in a gear train and an output shaft. The gear train transmits torque at the start of the vehicle. The output shaft is integrated with a secondary pulley.

In the device described in any one of these publications, the gear train is provided in parallel with the belt-type continuously variable transmission, and the device is configured to transmit torque for moving the vehicle mainly via the gear train at the start of the vehicle. In order to transmit torque via the continuously variable transmission in a forward traveling state, the transmission path of torque is changed, and the change is configured to be carried out by using the one-way clutch. However, the torque transmission direction of the one-way clutch is limited to one direction, while torque needs to be transmitted in any one of forward and reverse directions at the time when the vehicle actually travels, and it is required not to cause the one-way clutch to function depending on the configuration of the torque transmission path. Therefore, as described in the above-described publications, it is required to use both the one-way clutch and the friction clutch. Thus, with the configuration described in each of the above-described publications, even when it is possible to avoid or suppress application of large torque to the continuously variable transmission at the start of the vehicle, the configuration of the device as a whole increases in size, so there is a possibility that vehicle mountability is impaired.

The device described in JP 2005-308041A and the device described in JP 2004-076876 A each include the forward-reverse switching mechanism formed of the planetary gear train. However, in the former configuration described in JP 2005-308041 A, when the vehicle travels while transmitting torque by the belt-type continuously Variable transmission, torque from the engine is transmitted to the sun gear and torque from the gear train is transmitted to the ring gear. Therefore, there occurs a large rotation speed difference between the sun gear, pinion gears and the ring gear, and there is a possibility that this causes a loss of power, degradation of lubricating oil, noise or vibrations. In the latter configuration described in JP 2004-076876 A, when the vehicle travels while the gear train is transmitting torque, torque from the engine is transmitted to the sun gear of the planetary gear train that constitutes the forward-reverse switching mechanism, and torque is transmitted from the output shaft side to the ring gear via the continuously variable transmission. As a result, as in the case of the device described in JP 2005-308041 A, there occurs a large rotation speed difference between the sun gear, the pinion gears and the ring gear, and there is a possibility that this causes a loss of power, degradation of lubricating oil, noise or vibrations.

SUMMARY OF THE INVENTION

The invention is made by focusing on the above-described technical inconvenience, and it is an object of the invention to provide a vehicle power transmission device that includes a continuously variable transmission, that is able to set a speed ratio exceeding a maximum speed ratio or minimum speed ratio that can be set by the continuously variable transmission and that is easy to reduce in size and excellent in durability.

In order to solve the above-described inconvenience, the invention provides a vehicle power transmission device in which a continuously variable transmission and a gear train are provided between, an input shaft and an output shaft so as to be able to transmit torque between the input shaft and the output shaft, torque output from a driving force source is input to the input shaft, the output shaft outputs torque, the continuously variable transmission-continuously changes a speed ratio, the gear train has at least one speed ratio that cannot be set by the continuously variable transmission. In the vehicle power transmission device, a forward-reverse switching mechanism is arranged along the same axis as an axis of the input shaft, and the forward-reverse switching mechanism carries out differential action by using three rotating elements including an input element, an output element and a reaction element of which rotation is stopped to rotate the input element and the output element in mutually opposite directions; a first clutch mechanism and a brake mechanism are provided, the first clutch mechanism couples at least two rotating elements among these three rotating elements, the brake mechanism stops rotation of the reaction element; the input element and the output shaft are coupled to each other via the continuously variable transmission, a second clutch mechanism is provided in a first torque transmission path that is routed from the input shaft to the output shaft via the continuously variable transmission, the second clutch mechanism transmits or interrupts torque; and the output element arid the output shaft are coupled to each other via the gear train, a third clutch mechanism is provided in a second torque transmission path that is routed from the output element to the output shaft via the gear train, the third clutch mechanism transmits or interrupts torque.

The gear train may be configured to set a speed ratio larger than a maximum speed ratio of the continuously variable transmission or a speed ratio smaller than a minimum speed ratio of the continuously variable transmission by using a plurality of gears.

The continuously variable transmission may include a drive-side member and an output-side member, torque may be transmitted from the input shaft to the drive-side member, the output-side member may output torque to the output shaft, and the second clutch mechanism may be provided between the output-side member and the output shaft and may be configured to selectively couple the output-side member to the output shaft.

When the continuously variable transmission is configured to include the drive-side member to which torque is transmitted from the input shaft and the output-side member that outputs torque to the output shaft, the second clutch mechanism may be provided between the input shaft and the drive-side member and may be configured to selectively couple the input shaft to the drive-side member.

In addition, in the invention, the first clutch mechanism and the second clutch mechanism each may be formed of a friction clutch.

On the other hand, the third clutch mechanism in the invention may be formed of an intermeshing clutch.

More specifically, the gear train in the invention may include a drive gear, an intermediate shaft, one idle gear or multiple, idle gears integrally rotating with each other, and a driven gear, the drive gear may be integrally coupled to the output element, the one idle gear or the multiple idle gears may be provided on the intermediate shaft, torque may be transmitted from the drive gear to the driven gear via the idle gear(s), and the driven gear may be arranged along the same axis as an axis of the output shaft, and the third clutch mechanism may be configured to couple the driven gear to the output shaft or release the driven gear from the output shaft.

Alternatively, the gear train in the invention may include a drive gear, an intermediate shaft, one idle gear or multiple idle gears integrally rotating with each other, and a driven gear, the drive gear may be provided along the same axis as an axis of the output element, the one idle gear or the multiple idle gears may be provided on the intermediate shaft, torque may be transmitted from the drive gear to the driven gear via the idle gear, the driven gear may be arranged along the same axis as an axis of the output shaft, and the third clutch mechanism may be configured to couple the output element to the drive gear or release the output element from the drive gear.

Furthermore, the gear train in the invention may include a drive gear, a driven gear, an intermediate shaft, a first idle gear, and a second idle gear, the drive gear may be integrally coupled to the output element, the driven gear may be arranged on the output shaft and coupled to the output shaft, the first idle gear may be provided on the intermediate shaft so as to be rotatable with respect to the intermediate shaft, the first idle gear may be in mesh with the drive gear, the second idle gear may be provided on the intermediate shaft so as to rotate together with the intermediate shaft, the second idle gear may be in mesh with the driven gear, and the third clutch mechanism may be configured to couple the first idle gear to the intermediate shaft or release the first idle gear from the intermediate shaft.

The gear train in the invention may include a drive gear, a driven gear, an intermediate shaft, a first idle gear, and a second idle gear, the drive gear may be integrally coupled to the output element, the driven gear may be arranged on the output shaft and coupled to the output shaft, the first idle gear may be provided on the intermediate shaft so as to rotate together with the intermediate shaft, the first idle gear may be in mesh with the drive gear, the second idle gear may be provided on the intermediate shaft so as to be rotatable with respect to the intermediate shaft, the second idle gear may be in mesh with the driven gear, and the third clutch mechanism may be configured to couple the second idle gear to the intermediate shaft or release the second idle gear from the intermediate shaft.

On the other hand, the forward-reverse switching mechanism in the invention may include a double-pinion-type planetary gear train, the double-pinion-type planetary gear train may include a sun gear, a ring gear, first pinion gears, second pinion gears, and a carrier, the sun gear may be an external gear, the ring gear may be an internal gear arranged concentrically with the sun gear, the first pinion gears may be in mesh with the sun gear, the second pinion gears may be in mesh with the first pinion gears and the ring gear, the carrier may hold these first pinion gears and second pinion gears such that each of the first pinion gears and the second pinion gears is rotatable and revolvable.

In the invention, when the forward-reverse switching mechanism is configured as described above, the sun gear may be coupled to the input shaft and the continuously variable transmission, the carrier may be coupled to the gear train, and the ring gear may be configured such that rotation of the ring gear is stopped by the brake mechanism.

Different from this, in the invention, the carrier may be coupled to the input shaft and the continuously variable transmission, the sun gear may be coupled to the gear train, arid the ring gear may be configured such that rotation of the ring gear is stopped by the brake mechanism.

The forward-reverse switching mechanism in the invention may include a single-pinion-type planetary gear train, the single-pinion-type planetary gear train may include a sun gear, a ring gear, pinion gears, and a carrier, the sun gear may be an external gear, the ring gear may be an internal gear arranged concentrically with the sun gear, the pinion gears may be in mesh with the sun gear and the ring gear, the carrier may hold the pinion gears such that each of the pinion gears is rotatable and revolvable. In this case, the ring gear may be coupled to the input shaft and the continuously variable transmission, the sun gear may be coupled to the gear train, and the carrier may be configured such that rotation of the carrier is stopped by the brake mechanism.

The forward-reverse switching mechanism in the invention may include a planetary gear train that can be expressed by a collinear diagram that represents the elements by mutually parallel lines and that indicates a rotation speed of each element by a distance from an intersection with a base line perpendicular to the corresponding line, and the reaction element may be an element that is represented by the line located at a center in the collinear diagram, the input element may be an element that is represented by one of the right and left lines in the collinear diagram, and the output element may be an element that is represented by one of the right and left lines in the collinear diagram.

Thus, according to the invention, by coupling at least two rotating elements in the forward-reverse switching mechanism by the first clutch, the whole of the forward-reverse switching mechanism integrally rotates, and torque is transmitted from the input shaft to the gear train and the continuously variable transmission. Thus, by releasing the second clutch mechanism in this state and engaging the third clutch mechanism, the continuously variable transmission is disconnected from the output shaft, and the gear train is coupled to the output shaft, so the input shaft and the output shaft are coupled to each other via the gear train. The speed ratio of the gear train is the speed ratio that cannot be set by the continuously variable transmission, and is a speed ratio larger than the maximum speed ratio of the continuously variable transmission or a speed ratio smaller than the minimum speed ratio of the continuously variable transmission, so the speed ratio range of the whole of the power transmission device is wider than the speed ratio range of the continuously variable transmission.

When the brake mechanism is engaged instead of the first clutch mechanism, rotation of the reaction element is stopped, and the output element rotates in a direction opposite to the direction in which the input element rotates, so the vehicle is able to travel backward. In this case, torque is transmitted from the output element to the output shaft via the gear train and the third clutch mechanism, so the speed ratio is allowed to be set to a large speed ratio that cannot be set by the continuously variable transmission. In terms of this point as well, it is possible to increase the speed ratio range of the whole of the power transmission device.

In addition, torque is input from the output shaft side when the vehicle; decelerates. By providing the second clutch mechanism between the driven-side member of the continuously variable transmission and the output shaft and releasing the second clutch mechanism, it is possible to avoid co-rotation of the continuously variable transmission by interrupting torque that is input from the output shaft to the continuously variable transmission.

When the first clutch mechanism is released in a state where the continuously variable transmission is controlled so that the speed ratio becomes close to the speed ratio of the gear train and the second clutch mechanism is engaged, the input shaft and the output shaft are coupled to each other via the continuously variable transmission and the second clutch mechanism, and the gear train is disconnected from the input shaft. Thus, it is possible to set the speed ratio as needed by the continuously variable transmission. In this case, when the first clutch mechanism and the second clutch mechanism each are formed of a friction clutch, by gradually changing the amount of torque assigned to the first clutch mechanism and the second clutch mechanism, it is possible to smooth a change in the torque of the output shaft With this configuration, it is possible to prevent or suppress a shift shock or a feeling of strangeness due to a change in driving force.

When the third clutch mechanism is released in this state, the gear train is also interrupted from the output shaft. Therefore, it is possible to eliminate a situation that the gear train is co-rotated in the case where the vehicle travels while transmitting torque by the continuously variable transmission, a situation that torque is input from not only the input element of the forward-reverse switching mechanism but also the output element and then a rotation speed difference between the elements increases, or the like. As a result, it is possible to not only reduce a loss of power but also improve durability and suppress noise and vibrations. By forming the third clutch mechanism from an intermeshing clutch, it is possible to simplify the configuration of the overall power transmission device and reduce the size of the overall power transmission device. In addition, engagement or release is carried out in a state where almost no torque is applied, so engagement and release operations are not impaired.

According to the invention, the first to third clutch mechanisms and the brake mechanism each may be formed of a single mechanism, such as a friction or intermeshing clutch, brake, or the like, so it is possible to simplify the configuration of the overall power transmission device and reduce the size of the overall power transmission device. Particularly, by forming the forward-reverse switching mechanism from the single-pinion-type or double-pinion-type planetary gear train, the axial length of the overall power transmission device is reduced, with the result that it is possible to improve vehicle mountability.

MODES FOR CARRYING OUT THE INVENTION

A power transmission device according to the invention is a device for transmitting power output from a driving force source, such as an engine and a motor, to a drive wheel and is a device having a shift function. That is, the power transmission device is a device generally called a transmission or a transaxle. Particularly, a device intended by the invention is a power transmission device including a continuously variable transmission and a gear train. The continuously variable transmission and the gear train are arranged in parallel with each other between an input shaft and an output shaft. The gear train has a predetermined speed ratio (gear ratio). The continuously variable transmission may be an existing known belt-type continuously variable transmission or toroidal-type continuously variable transmission. The belt-type continuously variable transmission is suitable for a power transmission device that is mounted on a front-engine front-drive vehicle (FF vehicle). The toroidal-type continuously variable transmission is suitable for a power transmission device that is mounted on a front-engine rear-drive vehicle (FR vehicle). The gear train, in short, just needs to be a gear that is able to transmit torque from the input shaft to the output shaft In the invention, because a speed ratio that cannot be set by the continuously variable transmission is set by the gear train, the gear train is formed of a plurality of gears in mesh with each other. The gear ratio (the ratio of teeth) of the gear train is configured to be able to set a speed ratio larger than a maximum speed ratio of the continuously variable transmission or a speed ratio smaller than a minimum speed ratio of the continuously variable transmission. In order not to apply large torque at the start of the vehicle to the continuously variable transmission, the gear train is preferably configured to be able to set the speed ratio larger than the maximum speed ratio of the continuously variable transmission. In order to reduce fuel consumption by reducing a rotation speed of a driving force source during traveling, the gear train is preferably configured to be able to set the speed ratio smaller than the minimum speed ratio of the continuously variable transmission.

Figure 1:
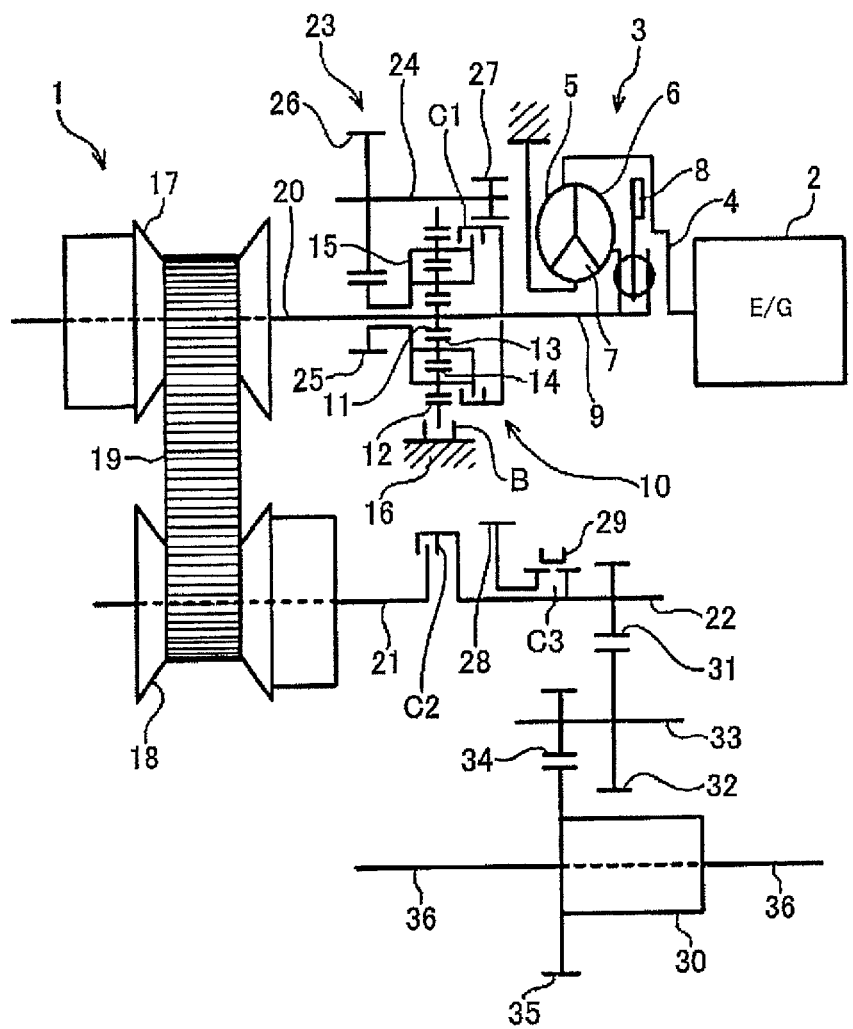
FIG. 1 is a skeletal view for illustrating an example of a vehicle power transmission device according to the invention.

A specific example of the vehicle power transmission device is shown in FIG. 1. The example shown here is configured-to be suitable for an FF vehicle. Therefore, a belt-type continuously variable transmission is employed as a continuously variable transmission 1, and a driving force source is formed of an internal combustion engine (E/G, hereinafter, referred to as engine) 2, such as a gasoline engine.

A torque converter 3 equipped with a lockup clutch is coupled to an output shaft (crankshaft) of the engine 2. The torque converter 3 has an existing widely known configuration. A turbine runner 6 is opposed to a pump impeller 5 integrated with a front cover 4. A stator 7 is arranged between these pump impeller 5 and turbine runner 6. The stator 7 is held via a one-way clutch (not shown). The lockup clutch 8 that rotates integrally with the turbine runner 6 is opposed to the inner surface of the front cover 4. In response to a pressure difference between both sides of the lockup clutch 8, the lockup clutch 8 is configured to contact the inner surface of the front cover 4 to enter an engaged state where torque is transmitted or conversely move away from the inner surface of the front cover 4 to enter a released state where transmission of torque is interrupted. An input shaft 9 is coupled to the turbine runner 6.

A forward-reverse switching mechanism 10 is arranged along the same axis as the axis of the input shaft 9. The forward-reverse switching mechanism 10 is a mechanism for changing between a forward traveling state and a backward traveling state. In the forward traveling state, torque transmitted from the input shaft 9 is transmitted without changing its direction. In the backward traveling state, torque transmitted from the input shaft 9 is transmitted by inverting its direction. In the invention, the forward-reverse switching mechanism 10 is formed of a so-called differential mechanism in which three rotating elements carry out differential action from each other. Various differential mechanisms of this type are conventionally known, and any differential mechanism may be employed in the invention. In the example shown in FIG. 1, the forward-reverse switching mechanism 10 is formed of a double-pinion-type planetary gear train.

The double-pinion-type planetary gear train includes a sun gear 11, a ring gear 12, first pinion gears 13, second pinion gears 14, and a carrier 15. The sun gear 11 is an external gear, the ring gear 12 is an internal gear arranged concentrically with the sun gear 11. The first pinion gears 13 are in mesh with the sun gear 11. The second pinion gears 14 are in mesh with the corresponding first pinion gears 13 and the ring gear 12. The carrier 15 holds these first and second pinion gears 13,14 such that each of the first and second pinion gears 13, 14 is rotatable and revolvable. The input shaft 9 is coupled to the sun gear 11, and the sun gear 11 serves as an input element. A brake mechanism B is provided. The brake mechanism B selectively stops rotation of the ring gear 12. Thus, the ring gear 12 serves as a reaction element. The brake mechanism B is provided between the ring gear 12 and a fixed portion 16, such as a casing. The brake mechanism B may be formed of a friction brake, such as a multi-disc brake, or an intermeshing brake.

The carrier 15 serves as an output element. A first clutch mechanism C1 is provided between the carrier 15 and the sun gear 11 or the input shaft 9. The first clutch mechanism C1 is used to integrally rotate the whole planetary gear train by coupling these carrier 15 and sun gear 11. The first clutch mechanism C1 is used to set a forward traveling state, and is a clutch that may be referred to as forward clutch. Because the first clutch mechanism C1, in short, just needs to be able to selectively transmit or interrupt torque, the first clutch mechanism C1 may be any one of a friction clutch and an intermeshing clutch. The first clutch mechanism C1 is preferably formed of a wet-type or dry-type friction clutch of which a transmitted torque capacity gradually increases or decreases with an engagement force. The first clutch mechanism C1 is preferably configured to directly transmit the torque of the input shaft 9 to the carrier 15 that is the output element In short, the first clutch mechanism C1 just needs to be configured to integrate the whole planetary gear train by coupling at least two rotating elements among the three rotating elements of the planetary gar train that constitutes the forward-reverse switching mechanism 10.

Figures 2, 3:
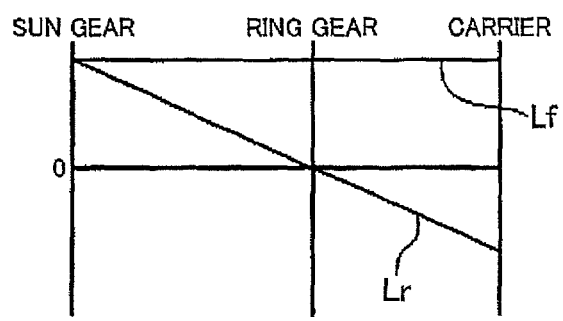
FIG. 2 is a collinear diagram for a planetary gear train that constitutes a forward-reverse switching mechanism.
FIG. 3 is a table that collectively shows operation states of clutch mechanisms and a brake mechanism.

The planetary gear train that constitutes the forward-reverse switching mechanism 10 can be expressed by a collinear diagram. FIG. 2 shows a collinear diagram that shows the forward-reverse switching mechanism 10 shown in FIG. 1. As is understood from FIG. 2, the sun gear 11, the ring gear 12 and the carrier 15 are represented by mutually parallel lines, the line that represents the sun gear 11 and the line that represents the carrier 15 are located at both right and left ends, and the line that represents the ring gear 12 that is the reaction element is arranged at the center. Where the interval between the line that represents the sun gear 11 and the line that represents the carrier 15 is "1", the interval between the line that represents the ring gear 12 and the line that represents the carrier 15 is set to a value corresponding to the ratio (that is, the gear ratio) of the number of teeth of the ring gear 12 to the number of teeth of the sun gear 11. A distance from a base line O on each line indicates the rotation speed of a corresponding one of the rotating elements. Thus, when the first clutch mechanism C1 is engaged, the whole forward-reverse switching mechanism 10 rotates integrally. Therefore, the rotation speed of each rotating element is indicated by a straight line Lf, whereas, when the ring gear 12 is fixed by the brake mechanism B, the rotation speed and rotation direction of each rotating element are indicated by a straight line Lr. That is, the carrier 15 rotates in a direction opposite to the direction in which the sun gear 11 rotates.

As is conventionally known, the continuously variable transmission 1 includes a primary pulley 17, a secondary pulley 18 and a belt 19. The primary pulley 17 is a drive-side member. The secondary pulley 18 is a driven-side member. The belt 19 is wound around these pulleys 17, 18. Each of the pulleys 17, 18 is configured such that the winding radius of the belt 19 increases or decreases by reducing or increasing the width of a groove in which the belt 19 is wound. That is, the continuously variable transmission 1 is configured to change its speed ratio by changing the width of the groove in which the belt 19 is wound.

The primary pulley 17 is arranged along the same axis as the axis of the input shaft 9 across the forward-reverse switching mechanism 10 from the engine 2. A primary shaft 20 integrated with the primary pulley 17 is coupled to the sun gear 11 that is the input element of the forward-reverse switching mechanism 10. The secondary pulley 18 is arranged such that the rotation central axis of the secondary pulley 18 is parallel to the rotation central axis of the primary pulley 17. The secondary pulley 18 includes a secondary shaft 21 provided along its rotation central axis. The output shaft 22 is arranged along the same axis as the axis of the secondary shaft 21. Thus, the output shaft 22 is parallel to the above-described input shaft 9.

A second clutch mechanism C2 is provided between the output shaft 22 and the secondary shaft 21. The second clutch mechanism C2 selectively couples these output shaft 22 and secondary shaft 21. The second clutch mechanism C2, in short, just needs to be able to selectively transmit or interrupt torque between the secondary pulley 18 and the output shaft 22. Therefore, the second clutch mechanism C2 may be any one of a friction clutch and an intermeshing clutch. However, the second clutch mechanism C2 is preferably formed of a wet-type or dry-type friction clutch of which a transmitted torque capacity gradually increases or decreases with an engagement force.

Next, a gear train 23 arranged in parallel with the above-described continuously variable transmission 1 will be described. The gear train 23 is a speed reduction mechanism that sets a speed ratio larger than the maximum speed ratio of the continuously variable transmission 1 or a speed increasing mechanism that sets a speed ratio smaller than the minimum speed ratio of the continuously variable transmission 1. The gear train 23 in the example shown in FIG. 1 is configured as a speed reduction mechanism. An idle gear is provided in order to set the rotation directions of the input shaft 9 and output shaft 22 to the same direction.

That is, a counter shaft 24 is arranged parallel to the input shaft 9 and the output shaft 22. The counter shaft 24 corresponds to an intermediate shaft according to the invention. A drive gear 25 is integrally coupled to the carrier 15 that is the output element in the forward-reverse switching mechanism 10. A counter driven gear 26 is integrated with the counter shaft 24. The counter driven gear 26 is in mesh with the drive gear 25. The counter driven gear 26 has a larger diameter than the drive gear 25. The counter driven gear 26 is configured to provide speed reduction action when torque is transmitted from the drive gear 25 toward the counter driven gear 26. A counter drive gear 27 is connected to the counter shaft 24. The counter drive gear 27 has a smaller diameter than the counter driven gear 26. A driven gear 28 is arranged on the output shaft 22 so as to be relatively rotatable with respect to the output shaft 22. The driven gear 28 is in mesh with the counter drive gear 27. Thus, the counter driven gear 26 and the counter drive gear 27 correspond to an idle gear according to the invention.

The driven gear 28 has a larger diameter than the counter drive gear 27. The driven gear 28 is configured to provide speed reduction action when torque is transmitted from the counter drive gear 27 toward the driven gear 28. Thus, the speed ratio (gear ratio) of the gear train 23 is a speed ratio (gear ratio) obtained by multiplying a speed ratio (gear ratio) between the drive gear 25 and the counter driven gear 26 by a speed ratio (gear ratio) between the counter drive gear 27 and the driven gear 28. The gear train 23 shown in FIG. 1 is configured such that the speed ratio (gear ratio) becomes larger than the maximum speed ratio of the continuously variable transmission 1.

In the example shown in FIG. 1, a third clutch mechanism C3 is provided. The third clutch mechanism C3 couples the driven gear 28 to the output shaft 22 or releases the coupling. Thus, the first clutch mechanism C1 may be provided on the input shaft 9 side of the gear train 23, the third clutch mechanism C3 may be provided on the output shaft 22 side, and the first clutch mechanism C1 may be a friction clutch. Therefore, the third clutch mechanism C3 just needs to be configured to change between two states, that is, an engaged state and a released state, and does not need to be configured such that the transmitted torque capacity takes a value between 0% and 100%. Therefore, the third clutch mechanism C3 may be formed of an intermeshing clutch, such as a dog clutch and a synchronizer. FIG. 1 shows an example in which the third clutch mechanism C3 is formed of a synchronizer that couples the driven gear 28 to the output shaft 22 by fitting a sleeve 29 to splines formed at the boss portion of the driven gear 28 and splines formed at the hub of the output shaft 22.

The example shown in FIG. 1 is an example configured to be suitable for an FF vehicle as described above. Thus, torque is configured to be output from the output shaft 22 to a front differential 30 that is a final reduction gear. That is, the output gear 31 is connected to the output shaft 22, and the large-diameter gear 32 that is in mesh with the output gear 31 is connected to the speed reduction gear shaft 33. The small-diameter gear 34 is connected to the speed reduction gear shaft 33, and the small-diameter gear 34 is in mesh with the ring gear 35 of the front differential 30. The front differential 30 is configured to transmit torque, transmitted via the ring gear 35, from right and left drive shafts 36 to drive wheels (not shown).

The above-described power transmission device according to the invention is controlled so as to transmit torque to the output shaft 22 via a torque transmission path including the gear train 23 (second torque transmission path according to the invention) when the vehicle starts moving in the forward/traveling direction or the vehicle travels backward, and to transmit torque from the input shaft 9 to the output shaft 22 via a torque transmission path including the continuously variable transmission 1 (first torque transmission path according to the invention) when the vehicle travels forward in a state where a vehicle speed has increased to some extent For example, when drive position (drive range), is selected by a shift device or shift lever (not shown), the first clutch mechanism C1 and the third clutch mechanism C3 are engaged, and the second clutch mechanism C2 and the brake mechanism B are released. FIG. 3 collectively shows such engaged and released states in table. In FIG. 3, "ON" indicates an engaged state, and "OFF" indicates a released state. "ON" in the parentheses indicates a transitionally engaged stated.

At the time when the vehicle starts moving, in the forward traveling direction, by setting the clutch mechanisms and the brake mechanism in this way, torque output from the engine 2 is transmitted to the sun gear 11 of the forward-reverse switching mechanism 10 via the input shaft 9, and is transmitted to the carrier 15 via the first clutch mechanism C1. In other words, because the two rotating elements of the forward-reverse switching mechanism 10 are coupled to each other by the first clutch mechanism C1, the whole forward-reverse switching mechanism 10 is integrated. Thus, the forward-reverse switching mechanism 10 does not provide speed increasing/reduction action, and transmits the input torque from the carrier 15 to the drive gear 25. Because the driven gear 28 in the gear train 23 is coupled to the output shaft 22 by the third clutch mechanism C3, the torque of the input shaft 9 is transmitted to the output shaft 22 via the gear train 23. Torque is transmitted from the output gear 31 to the right and left drive wheels via a speed reduction gear train and the front differential 30, and then the vehicle starts moving. Because the continuously variable transmission 1 is constantly coupled to the input shaft 9 or the sun gear 11, torque output from the engine 2 is transmitted to the primary pulley 17 of the continuously variable transmission 1. However, because the second clutch mechanism C2 is in a released state at the start of the vehicle, and the continuously variable transmission 1 and the output shaft 22 are separated from each other such that no transmission of torque occurs, no transmission of torque occurs between the input shaft 9 and the output shaft 22 via the continuously variable transmission 1, and a so-called interlocking state is not established.

At the start of the vehicle, torque is transmitted from the input shaft 9 to the output shaft 22 via the gear train 23 as described above, and the gear train 23 provides speed reduction action. The speed ratio of the gear train 23 becomes the speed ratio larger than the maximum speed ratio that can be set by the continuously variable transmission 1. As a result, it is possible to obtain a large driving force for the vehicle. Because large torque at the start of the vehicle is not applied to the continuously variable transmission 1, it is not required to increase hydraulic pressure for setting the transmitted torque capacity. Therefore, it is possible to improve fuel economy as a result of a reduction in consumption of power for generating the hydraulic pressure, so it is possible to improve the durability of the continuously variable transmission 1. When the vehicle decelerates in a state where the first clutch mechanism C1 and the third clutch mechanism C3 are engaged, torque based on the traveling inertia force of the vehicle acts on the output shaft 22. However, because the secondary pulley 18 and the output shaft 22 are disconnected from each other as a result of a released state of the second clutch mechanism C2, so-called reverse input torque during deceleration is not applied to the continuously variable transmission 1. Therefore, it is possible to improve the durability of the continuously variable transmission 1 by reducing torque that is unnecessarily applied to the continuously variable transmission 1 and suppressing unnecessary rotation.

After the vehicle starts moving, and when the vehicle has accelerated to a predetermined vehicle speed, the first clutch mechanism C1 is released and the second clutch mechanism C2 is engaged in a state where the speed ratio of the continuously variable transmission 1 is set to the maximum value or a speed ratio close to the maximum value. Because the first clutch mechanism C1 is further released in a state where the brake mechanism B is released, the forward-reverse switching mechanism 10 enters a so-called free-rotating state, with the result that coupling of the input-shaft 9 with the gear train 23 is released. In contrast, because the secondary pulley 18 is coupled to the output shaft 22 by the second clutch mechanism C2, the input shaft 9 is eventually coupled to the output shaft 22 such that torque is transmitted via the continuously variable transmission 1. Thus, by gradually reducing the speed ratio of the continuously variable transmission 1 or changing the speed ratio in response to a vehicle speed and an accelerator operation amount, it is possible to set the engine rotation speed to a rotation speed having high fuel economy.

When changing from the state where torque is transmitted via the gear train 23 to the state where torque is transmitted via the continuously variable transmission 1 in this, way, because the speed ratio of the gear train 23 is larger than the maximum speed ratio of the continuously variable transmission 1, the speed ratio or the driving force changes. Thus, when the first clutch mechanism C1 is released and the second clutch mechanism C2 is engaged, those clutch mechanisms C1, C2 are transitionally subjected to slip control. That is, the transmitted torque capacity of the second clutch mechanism C2 is gradually increased by gradually increasing the engagement pressure of the second clutch mechanism C2, while simultaneously the transmitted torque capacity of the first clutch mechanism C1 is gradually reduced by gradually reducing the engagement pressure of the first clutch mechanism C1. This control is control that is conventionally known as clutch-to-clutch control. With this control, it is possible to avoid or suppress a shift shock or a feeling of strangeness because of a smooth change of the torque of the output shaft 22.

After transmission of torque via the continuously variable transmission 1 becomes a stable state as a result of the release of the first clutch mechanism C1 and the complete engagement of the second clutch mechanism C2, the third clutch mechanism C3 is released. That is, the gear train 23 is also separated from the output shaft 22. As a result, although torque is transmitted from the input shaft 9 to the sun gear 11 in the forward-reverse switching mechanism 10, the ring gear 12 and the carrier 15 are allowed to freely rotate. Therefore, the rotation speed difference between the rotating elements that constitute the forward-reverse switching mechanism 10 decreases, that is, for example, the whole forward-reverse switching mechanism 10 integrally rotates. Therefore, it is possible to suppress a power loss or a decrease in durability in the forward-reverse switching mechanism 10 or suppress noise or vibrations. When the third clutch mechanism C3 is released, because the first clutch mechanism C1 has been already released and no torque is applied to the gear train 23, it is possible to release the third clutch mechanism C3 during traveling even when the third clutch mechanism C3 is formed of an intermeshing clutch. In other words, with the above-described configuration, the third clutch mechanism C3 may be formed of an intermeshing clutch.

On the other hand, when the vehicle travels backward, the first clutch mechanism C1 and the second clutch mechanism C2 are released, and the third clutch mechanism C3 and the brake mechanism B are engaged, as shown in FIG. 3. In the forward-reverse switching mechanism 10, because torque from the engine 2 is input to the sun gear 11 in a state where the ring gear 12 is fixed by the brake mechanism B, the carrier 15 rotates in a direction opposite to the direction in which the sun gear 11 rotates. Thus, as in the case of the time when the vehicle starts moving in forward traveling, torque is transmitted from the input shaft 9 to the output shaft 22 via the gear train 23, and the output shaft 22 rotates in a direction in which the vehicle travels backward. The speed ratio in this case is a speed ratio obtained by multiplying the speed ratio of the gear train 23 by the speed ratio of the planetary gear train that constitutes the forward-reverse switching mechanism 10. Torque is transmitted from the output gear 31 to the right and left drive wheels via the speed reduction gear train and the front differential 30, and the vehicle travels backward. Because the second clutch mechanism C2 is released and the output shaft 22 is disconnected from the continuously variable transmission 1, no transmission of torque occurs between the input shaft 9 and the output shaft 22 via the continuously variable transmission 1, and a so-called interlocking state is not established.

As described above, with the above-described power transmission device according to the invention, when the vehicle starts moving in the forward traveling direction or travels backward, because the large speed ratio that cannot be set by the continuously variable transmission 1 can be set, it is possible to improve accelerating ability from standstill, and it is possible to cause the vehicle to slowly travel at the time when the vehicle travels backward. Because the continuously variable transmission 1 does not get involved in transmission of torque for traveling in these cases, it is not required to increase belt clamping force in the continuously variable transmission 1. As a result, it is possible to reduce a power loss by reducing consumption of power for generating clamping force, and it is possible to improve the durability of the continuously variable transmission 1. In the power transmission device according to the invention, each clutch mechanism may be formed of a single component, such as a friction clutch and an intermeshing clutch, it is possible to simplify the configuration of the power transmission device as a whole or reduce the size of the configuration by reducing the number of components required.

Incidentally, when the power transmission device according to the invention transmits torque from the input shaft 9 to the output shaft 22 via the torque transmission path including the gear train 23, the torque transmission path including the continuously variable transmission 1 is separated from, the input shaft 9 or the output shaft 22, whereas, on the other hand, when torque is transmitted between the input shaft 9 and the output shaft 22 via the torque transmission path including the continuously variable transmission 1, the torque transmission path including the gear train 23 is separated from the input shaft 9 or the output shaft 22. The clutch mechanisms for those operations do not particularly need to be provided at the above-described locations shown in FIG. 1, and the clutch mechanisms may be provided at appropriate locations without impairment of the corresponding original functions. Hereinafter, those examples will be described.

Figure 4:
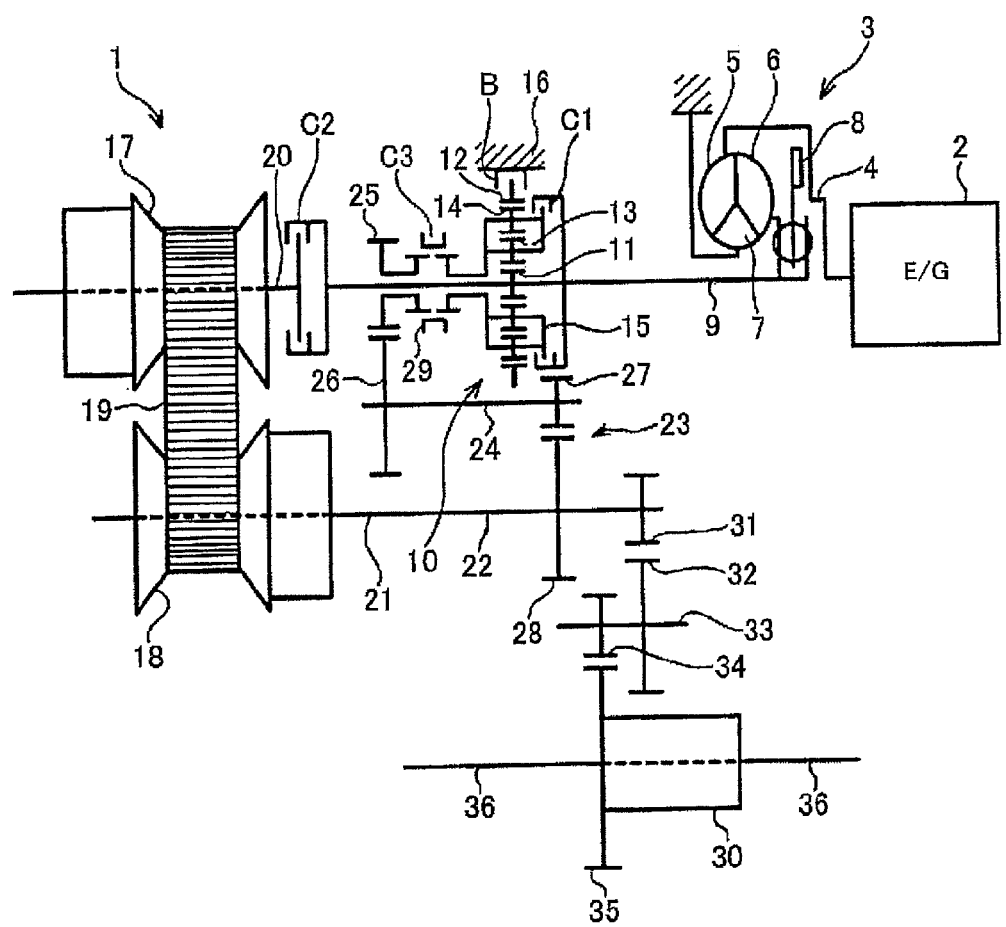
FIG. 4 is a skeletal view for illustrating a second specific example of the invention.

FIG. 4 is a skeletal view that shows one of those examples. A power transmission device shown here differs from the configuration shown in FIG. 1 in that the first to third clutch mechanisms C1, C2, C3 are arranged along the same axis as the axis of the input shaft 9, and the other configuration is similar to that of the example shown in FIG. 1. Thus, only the difference from FIG. 1 within the configuration of FIG. 4 will be described, like reference numerals in FIG. 4 denote similar components to those of FIG. 1, and the description thereof is omitted. Initially, the second clutch mechanism C2 will be described. In the example shown in FIG. 4, the second clutch mechanism C2 is arranged between the sun gear 11 and the primary shaft 20. That is, the second clutch mechanism C2 is configured to be released to disconnect the sun gear 11 from the primary pulley 17 at the time when the vehicle starts moving in the forward traveling direction or at the time when the vehicle travels backward, and to be engaged to couple the sun gear 11 to the primary pulley 17 at the time when the vehicle speed has increased after the vehicle starts moving. The third clutch mechanism C3 that is the intermeshing clutch is arranged along the same axis as the axis of the input shaft 9 or the primary shaft 20, and is configured to selectively couple the carrier 15 to the drive gear 25 or release, the coupling. The carrier 15 is the output element in the forward-reverse switching mechanism 10. With the above-described change of arrangement of the first and third clutch mechanisms C1, C3 from the configuration shown in FIG. 1, the secondary shaft 21 is directly coupled to the output shaft 22, and the driven gear 28 in the gear train 23 is connected to the output shaft 22 so as to integrally rotate with the output shaft 22.

With the power transmission device configured as shown in FIG. 4 as well the clutch mechanisms C1, C2, C3 and the brake mechanism B are engaged or released as show in the above-described FIG. 3 when the vehicle starts moving in the forward traveling direction, while the vehicle is traveling forward, or when the vehicle travels backward. As in the case of the power transmission device having the configuration shown in FIG. 1, transmission of torque via the torque transmission path formed of the gear train 23 (the second torque transmission path according to the invention) or transmission of torque via the torque transmission path mainly formed of the continuously variable transmission 1 (the first torque transmission path according to the invention) is carried out, and it is possible to obtain similar operation and similar advantageous effects to those, of the power transmission device shown in FIG. 1.

When configured as shown in FIG. 4, torque that acts from the input shaft 9 side to the second clutch mechanism C2 while the vehicle is traveling forward is the torque that has not received speed increasing/reduction action except the speed increasing/reduction action of the torque converter 3. That is, in a driving state, torque larger than or equal to the torque in the input shaft 9 does not act on the second clutch mechanism C2, so the second clutch mechanism C2 may have a smaller torque capacity and may be a clutch smaller in size than the configuration shown in FIG. 1. Similarly, when torque is transmitted to the output shaft 22 via the gear train 23, because the gear train 23 provides speed reduction action at the output side of the third clutch mechanism C3, torque increased in the gear train 23 does not act on the third clutch mechanism C3. Thus, the third clutch mechanism C3 may have a smaller torque capacity and may be a clutch smaller in size than the configuration shown in FIG. 1. With the configuration that the first clutch mechanism C1 and the brake mechanism B are mutually arranged along the same axis and control over the forward-reverse switching mechanism 10 is executed, it is possible to reduce a so-called drag in these first clutch mechanism C1 and brake mechanism B, which is similar to the case configured as shown in FIG. 1.

Figure 5:
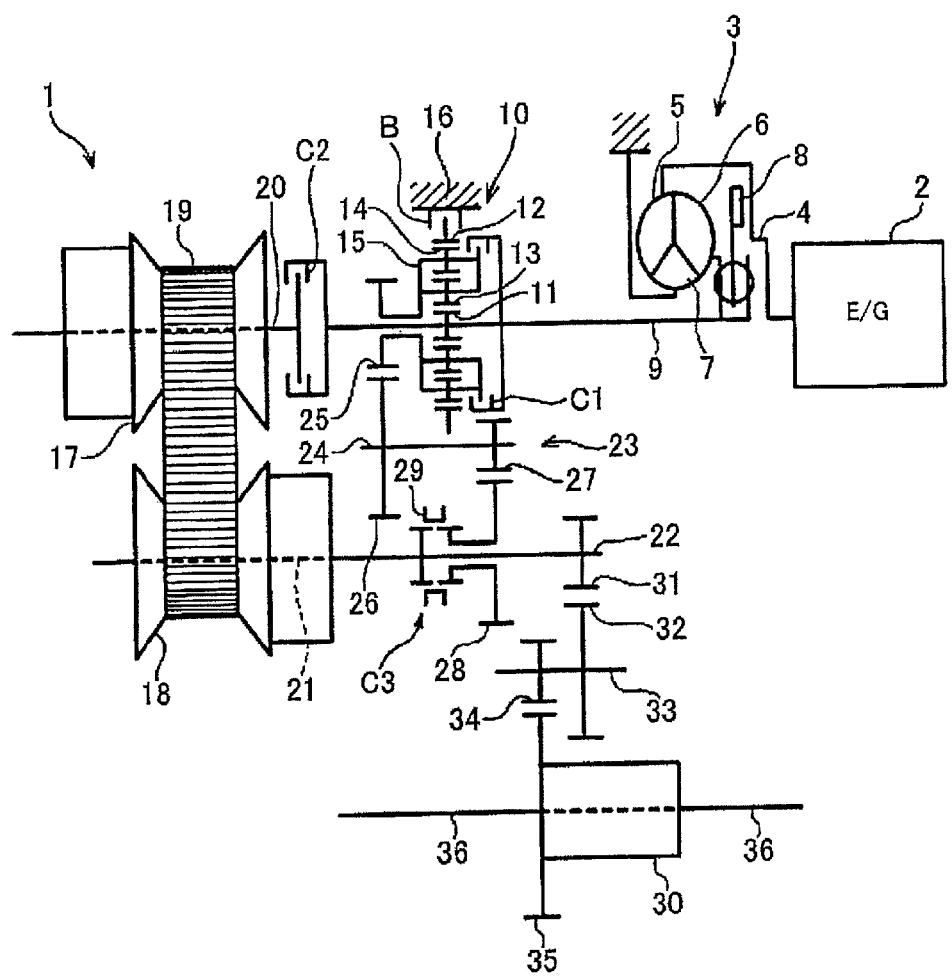
FIG. 5 is a skeletal view for illustrating a third specific example of the invention.

The example shown in FIG. 5 differs from the configuration shown in FIG. 1 in that the second clutch mechanism C2 is arranged along the same axis as the axis of the input shaft 9, and the other configuration is the same as the configuration shown in FIG. 1. Thus, only the difference from FIG. 1 within the configuration of FIG. 5 will be described, like reference numerals in FIG. 5 denote similar components to those of FIG. 1, and the description thereof is omitted. In the configuration shown in FIG. 5, with arrangement of the second clutch mechanism C2 along the same axis as the axis of the input shaft 9 or the primary shaft 20, the secondary shaft 21 is directly coupled to the output shaft 22. Thus, in the configuration shown in FIG. 5, because the second clutch mechanism C2 is arranged at the so-called input side of the continuously variable transmission 1, when the vehicle travels forward by using the power of the engine 2, torque larger than or equal to the torque that is transmitted from the engine 2 to the input shaft 9 does not act on the second clutch mechanism C2, as described, in the above-described example of FIG. 4. Therefore, with the configuration shown in FIG. 5 as well, the second clutch mechanism C2 may have a small torque capacity and may be a small clutch.

When the vehicle is decelerating toward a stop, the third clutch mechanism C3 may be changed from a released state to an engaged state in preparation for a restart. This change control is executed in a state where the speed ratio of the continuously variable transmission 1 is increased to about the maximum speed ratio with a decrease in vehicle speed. The speed ratio of the gear train 23 is larger than the maximum speed ratio of the continuously variable transmission 1, and is set to a value close to the maximum speed ratio. Thus, when the third clutch mechanism C3 is changed from the released state to the engaged state as described above, the first clutch mechanism C1 is engaged in advance. Thus, the rotation speed difference between the output shaft 22 and the driven gear 28 decreases, so it is possible to easily engage the third clutch mechanism C3 even when the third clutch mechanism C3 is an intermeshing clutch. With the configuration shown in FIG. 5 as well, of course, similar operation and advantageous effects to those of the power transmission device having the above-described configuration shown in FIG. 1 are obtained.

Figure 6:
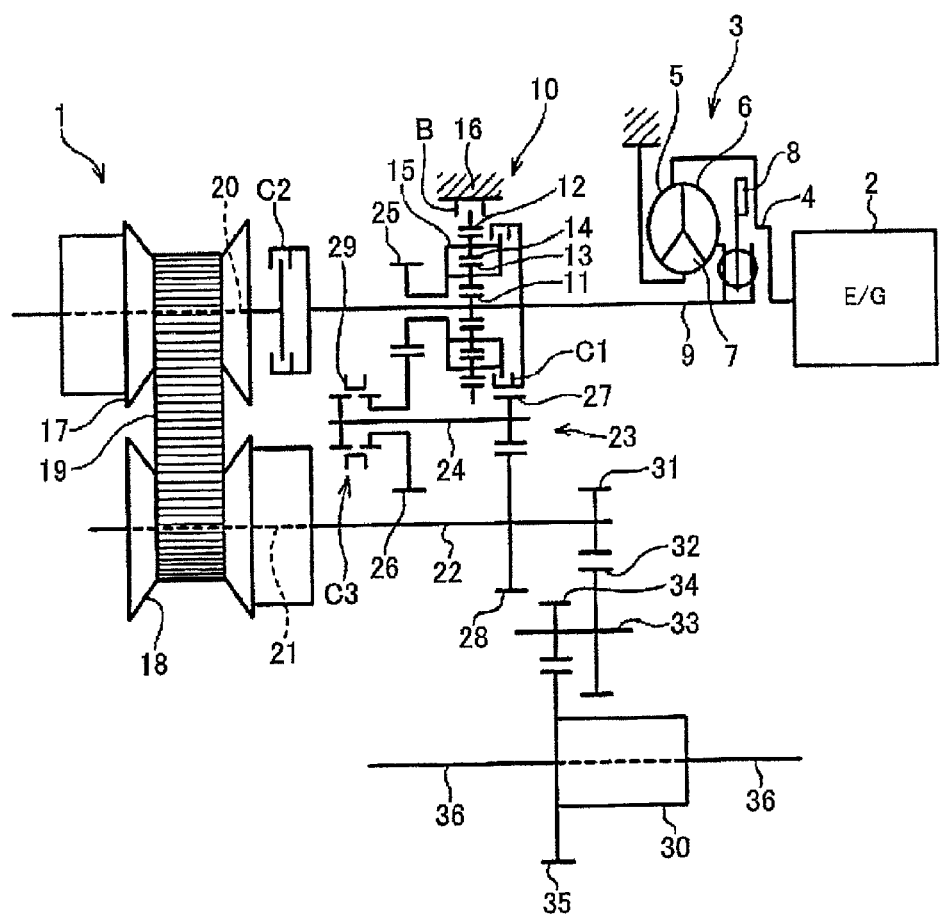
FIG. 6 is a skeletal view for illustrating a fourth specific example of the invention.

The example shown in FIG. 6 differs from the above-described configuration shown in FIG. 4 or the above-described configuration shown in FIG. 5 in that the counter driven gear 26 is rotatably connected to the counter shaft 24, the third clutch mechanism C3 is arranged along the same axis as the axis of the counter shaft 24, and the counter driven gear 26 is configured to be coupled to the counter shaft 24 or the coupling is configured to be released. The other configuration is the same as the configuration shown in FIG. 4 or the configuration shown in FIG. 5. Thus, only the difference from FIG. 1 within the configuration of FIG. 6 will be described, like reference numerals in FIG. 6 denote similar components to those of FIG. 1, and the description thereof is omitted. In the configuration shown in FIG. 6, with arrangement of the second clutch mechanism C2 along the same axis as the axis of the input shaft 9 or the primary shaft 20, the secondary shaft 21 is directly coupled to the output shaft 22.

Thus, in the configuration shown in FIG. 6, because the second clutch mechanism C2 is arranged at the so-called input side of the continuously variable transmission 1, when the vehicle travels in the forward traveling direction by using the power of the engine 2, torque larger than or equal to the torque that is transmitted from the engine 2 to the input shaft 9 does not act on the second clutch mechanism C2, as described in the above-described example of FIG. 4. Therefore, with the configuration shown in FIG. 6 as well, the second clutch mechanism C2 may have a small torque capacity and may be a small-size clutch. With the configuration shown in FIG. 6, because the third clutch mechanism C3 is arranged in the middle of the gear train 23, torque that acts on the third clutch mechanism C3 in the case where the vehicle starts moving by driving the engine 2 is the torque that is amplified between the drive gear 25 and the counter driven gear 26. Thus, with the configuration shown in FIG. 6, although it is required of the third clutch mechanism C3 to have a larger capacity than that in the case of the configuration shown in FIG. 4, the third clutch mechanism C3 may have a smaller capacity than that in the case of the configuration shown in FIG. 5. With the configuration shown in FIG. 6 as well, of course, similar operation and advantageous effects to those of the power transmission device having the above-described configuration shown in FIG. 1, FIG. 4 or FIG. 5 are obtained.

When the third clutch mechanism C3 is arranged on the counter shaft 24, the third clutch mechanism C3 may have a configuration other than the configuration shown in FIG. 6. For example, the power transmission device may be configured as follows. The counter driven gear 26 and the counter drive gear 27 are rotatably supported by the counter shaft 24, the third clutch mechanism C3 is arranged between those counter driven gear 26 and counter drive gear 27, and the third clutch mechanism C3 couples the counter driven gear -26 to the counter drive gear 27 or releases the coupling. Alternatively, the power transmission device may be configured as follows. The counter driven gear 26 is connected to the counter shaft 24 so as to integrally rotate with the counter shaft 24, the counter drive gear 27 is rotatably connected to the counter shaft 24, and the third clutch mechanism C3 couples the counter drive gear 27 to the counter shaft 24 or releases the coupling.

Figure 7:
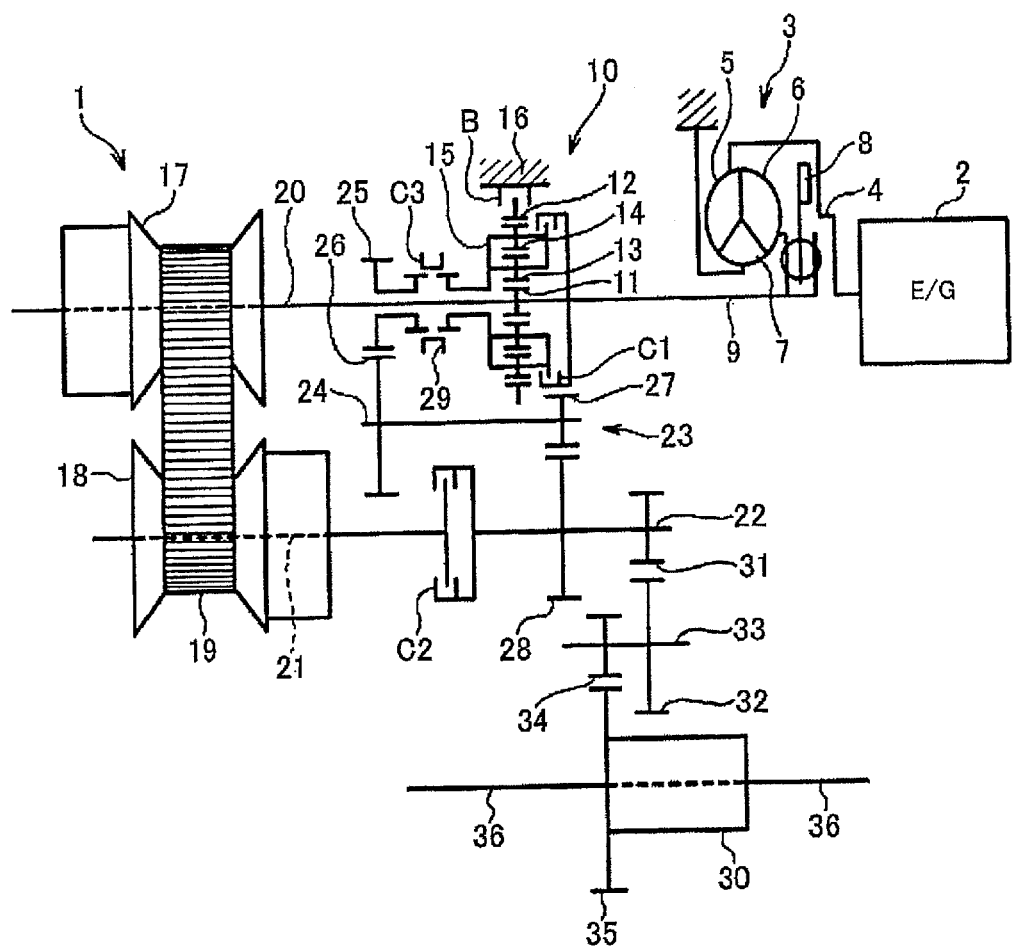
FIG. 7 is a skeletal view for illustrating a fifth specific example of the invention.

Next, the example shown in FIG. 7 will be described. A power transmission device shown in FIG. 7 differs from the above-described configuration shown in FIG. 1 in that the third clutch mechanism C3 is arranged along the same axis as the axis of the input shaft 9 or the primary shaft 20 as in the case of the configuration described with reference to FIG. 4, and the third clutch mechanism C3 engages the carrier 15 with the drive gear 25 or releases the engagement. With the configuration shown in FIG. 7 as well, the clutch mechanisms C1, C2, C3 and the brake mechanism B are engaged or released as in the case of the above-described specific examples. With the configuration shown in FIG. 7, the third clutch mechanism C3 may have a small capacity and a small size as in the case of the configuration shown in FIG. 4. As well as the power transmission device having the configuration shown in FIG. 1, when the vehicle decelerates in a state where the input shaft 9 is coupled to the output shaft 22 via the gear train 23, the second clutch mechanism C2 disconnects the continuously variable transmission 1 from the output shaft 22. Therefore, it is possible to avoid application of excessive torque to the continuously variable transmission 1. As a result, it is possible to improve the durability of the continuously variable transmission 1.

Figure 8:
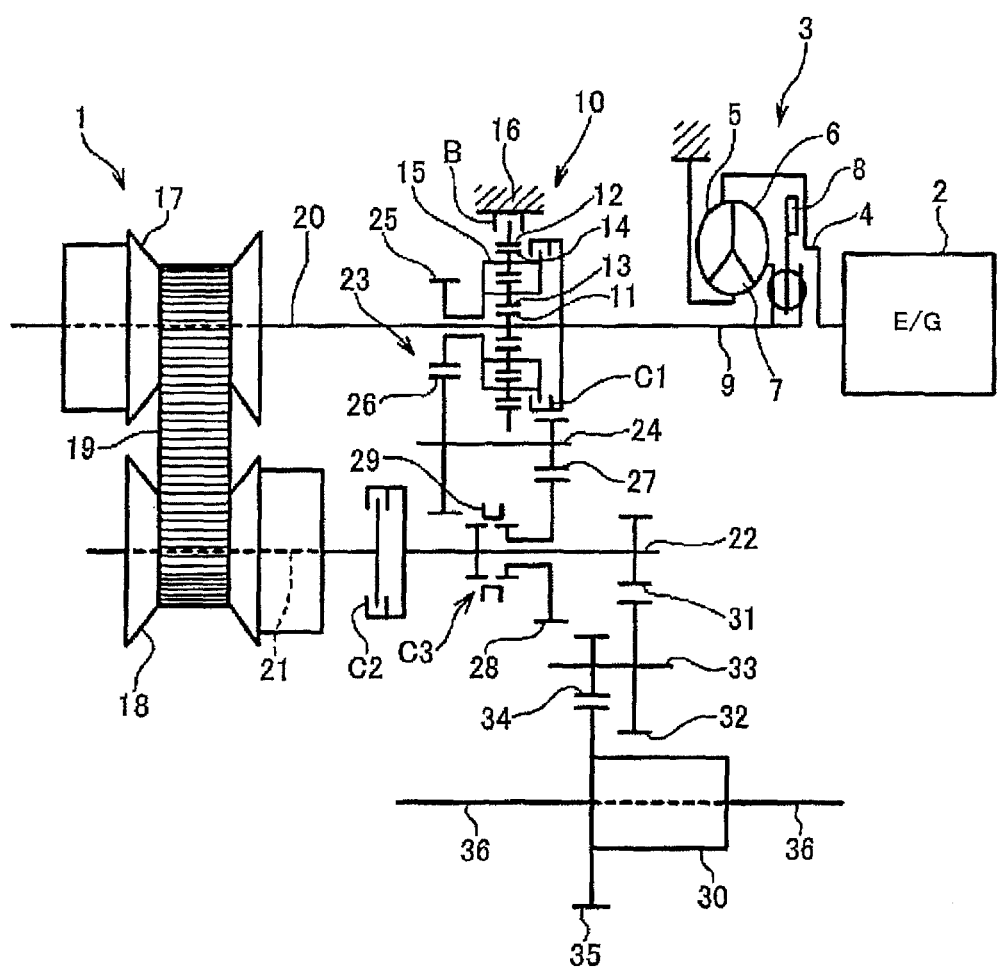
FIG. 8 is a skeletal view for illustrating a sixth specific example of the invention.

The above-described clutch mechanisms C1, C2, C3 or the locations of the gears in the axial direction may be determined as needed by design, and the locations of adjacent components in each of the above-described specific examples may be interchanged in the axial direction. One of those examples is shown in FIG. 8. The example shown here differs from the above-described configuration shown in FIG. 1 in that the third clutch mechanism C3 is arranged on the second clutch mechanism C2 side and, in contrast, the driven gear 28 is arranged on the output gear 31 side.

Figure 9:
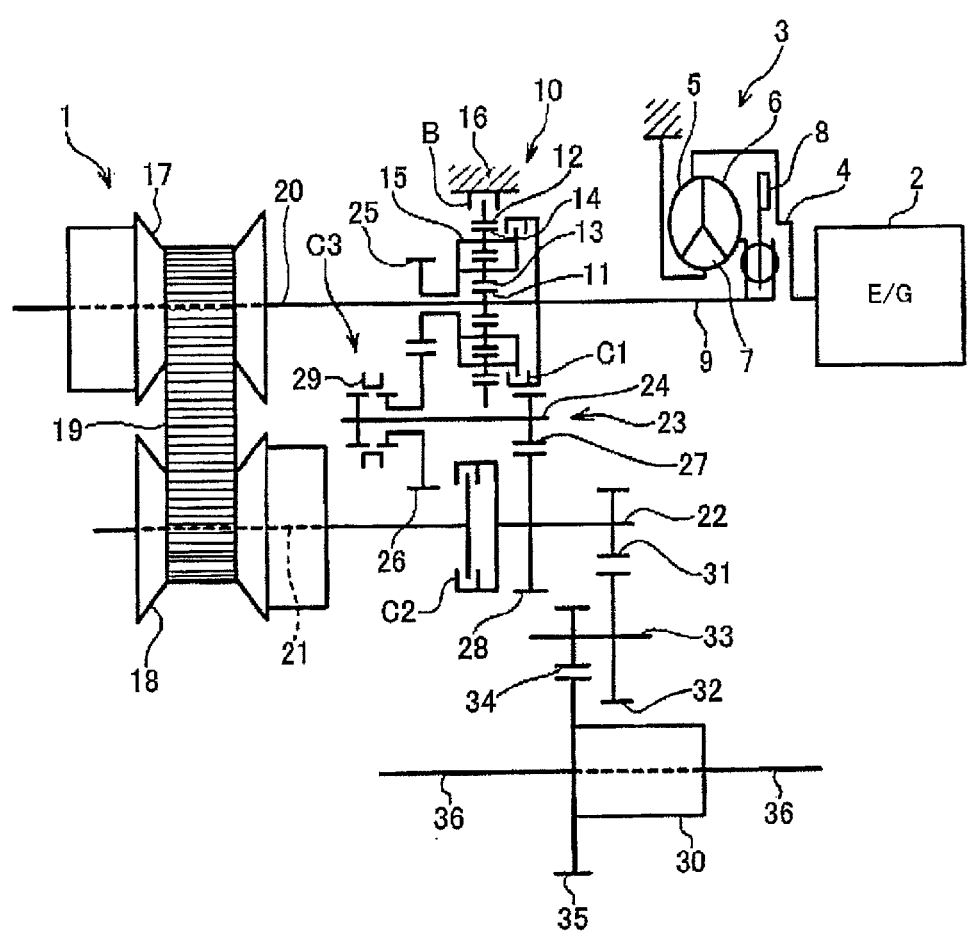
FIG. 9 is a skeletal view for illustrating a seventh specific example of the invention.

FIG. 9 further shows an example that differs from the configuration shown in FIG. 1 in that the third clutch mechanism C3 is arranged on the counter shaft 24, and the other configuration is similar to the configuration shown in FIG. 1. Thus, in the configuration shown in FIG. 9, the third clutch mechanism C3 may have a small capacity and a small size because of the configuration that the third clutch mechanism C3 is arranged in the middle of the gear train 23, as in the case of the example shown in FIG. 6. With the configuration shown in FIG. 9 as well, of course, similar operation and advantageous effects to those of the power transmission device having the above-described configuration shown in FIG. 1 are obtained.

Each of the above-described specific examples is an example in which the speed ratio of the gear train 23 is larger than the maximum speed ratio of the continuously variable transmission 1. However, the invention, in short, just needs to be configured such that a speed ratio that cannot be set by the continuously variable transmission 1 is set by the gear train 23. Thus, the speed ratio of the gear train 23 may be smaller than the minimum speed ratio of the continuously variable transmission 1. With this configuration, the engine rotation speed is allowed to be set to a lower rotation speed when the vehicle travels by operating the engine 2 at a low load as compared to the case of the continuously variable transmission 1. Therefore, it is possible to further improve fuel economy.

As described above, the power transmission device according to the invention just needs to be configured to be able to select one of the first torque transmission path and the second torque transmission path. The first torque transmission path transmits torque from the input shaft to the output shaft via the continuously variable transmission. The second torque transmission path transmits torque from the input shaft to the output shaft via the forward-reverse switching mechanism and the gear train. The forward-reverse switching mechanism has differential action. Thus, the third clutch mechanism C3 that sets the second torque transmission path in an interrupted state where torque is not transmittable or the coupled state of the input shaft 9 with the forward-reverse switching mechanism 10 may have a configuration other than the configurations shown in the above-described specific examples. One example is shown in FIG. 10.

Figure 10:
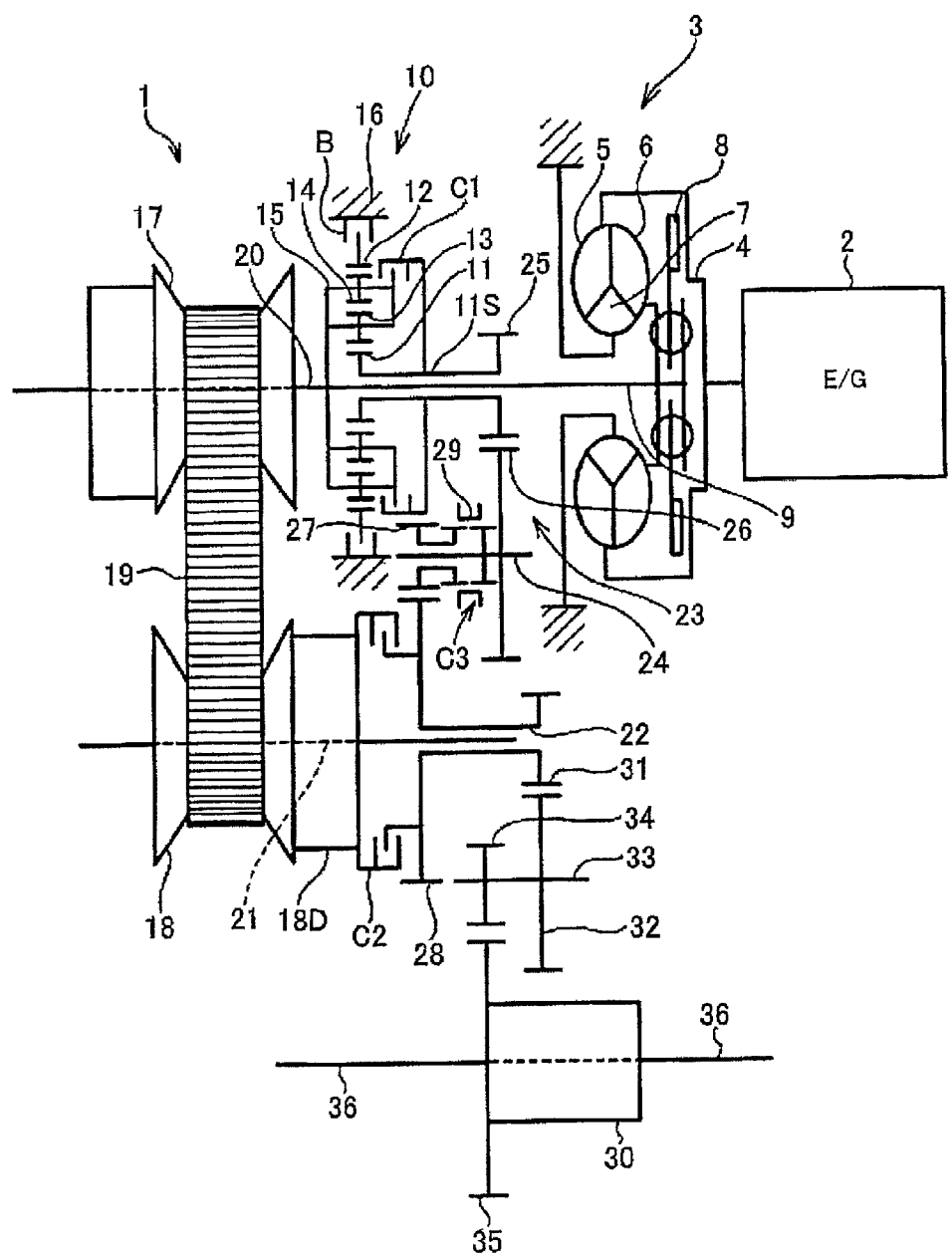
FIG. 10 is a skeletal view for illustrating an eighth specific example of the invention.

A power transmission device shown in FIG. 10 differs from those of the above-described specific examples in that the input shaft 9 is coupled to the carrier 15 in the forward-reverse switching mechanism 10. The third clutch mechanism C3 is arranged on the counter shaft 24, and is configured to couple the counter drive gear 27 to the counter shaft 24 or release the coupling. Other appropriate changes are made in accordance with such changes of the configuration of the above-described specific examples. The changes will be specifically described. The input shaft 9 is coupled to the primary shaft 20 in the continuously variable transmission 1 so as to integrally rotate with the primary shaft 20, and is coupled to the carrier 15 in the planetary gear train that constitutes the forward-reverse switching mechanism 10 so as to integrally rotate with the carrier 15. Thus, in the example shown in FIG. 10, the carrier 15 serves as the input element. A sun gear shaft 11 S that is a hollow shaft is integrated with the sun gear 11. The input shaft 9 extends through the inside of the sun gear shaft 11S. The sun gear shaft 11S and the input shaft 9 are supported so as to be relatively rotatable. In addition, the sun gear shaft 11S extends to the engine 2 side (right side in FIG. 10). The drive gear 25 is provided at the extended portion of the sun gear shaft 11S so as to integrally rotate with the sun gear shaft 11S.

The first clutch mechanism C1 is arranged between the drive gear 25 and the forward-reverse switching mechanism 10. In the example shown in FIG. 10, the first clutch mechanism C1 is configured to couple the sun gear shaft 11S to the carrier 15 or release the coupling. The brake mechanism B is provided between the ring gear 12 and the fixed portion 16, such as the casing. The brake mechanism B is configured to stop rotation of the ring gear 12 or release the stopped rotation of the ring gear 12. Thus, in the configuration shown in FIG. 10, the forward-reverse switching mechanism 10 and the first clutch mechanism C1, which have a large outside diameter, are arranged next to the primary pulley 17. Therefore, the axial length of the large-outside-diameter portion in the power transmission device decreases, and it is possible to reduce the axial length of at least the input shaft 9 side.

The counter driven gear 26 is provided on the counter shaft 24 arranged parallel to the input shaft 9 and the sun gear shaft 11S. The counter driven gear 26 is in mesh with the above-described drive gear 25. The counter driven gear 26 is connected to the counter shaft 24 by splines (not shown), or the like, so as to integrally rotate with the counter shaft 24. In the example shown in FIG. 10, the counter driven gear 26 has a larger diameter than the drive gear 25 so as to provide speed reduction action. The counter drive gear 27 is further rotatably connected to the counter shaft 24. The counter drive gear 27 is arranged on the continuously variable transmission 1 side with respect to the counter driven gear 26. The location of the counter drive gear 27 is more specifically, for example, a location on the radially outer side of the first clutch mechanism C1. Because the counter drive gear 27 is a gear having a smaller diameter than the above-described counter driven gear 26, when the counter drive gear 27 is arranged on the outer peripheral side of the first clutch mechanism C1 having a large outside diameter, it is possible to suppress an increase in the outside diameter of the overall power transmission device by avoiding arrangement of large-outside-diameter members radially next to each other, and to suppress an increase in the axial length.

The third clutch mechanism C3 that is an intermeshing clutch is arranged on the counter shaft 24 between the counter driven gear 26 and the counter drive gear 27. The third clutch mechanism C3 is formed of, for example, a synchronization coupling mechanism (synchronizer). The third clutch mechanism C3 is configured to couple the counter drive gear 27 to the counter shaft 24 or release the coupling.

In the configuration shown in FIG. 10 the output shaft 22 is formed of a hollow shaft. The output shaft 22 is arranged parallel to the input shaft 9 and the counter shaft 24, and is rotatably arranged along the same axis as the axis of the secondary pulley 18. The secondary shaft 21 is inserted inside the output shaft 22 so as to be rotatable with respect to the output shaft 22. The driven gear 28 is provided on the output shaft 22 so as to integrally rotate with the output shaft 22. The driven gear 28 is in mesh with the counter drive gear 27. The driven gear 28 is a gear having a larger diameter than the counter drive gear 27. Thus, speed reduction action arises when torque is transmitted from the counter drive gear 27 to the driven gear 28.

Because the counter drive gear 27 is arranged on the outer peripheral side of the first clutch mechanism C1 and the driven gear 28 is in mesh with the counter drive gear 27, the driven gear 28 is arranged next to the secondary pulley 18. The second clutch mechanism C2 is arranged between the secondary pulley 18 and the driven gear 28.

I The second clutch mechanism C2 is to allow the torque transmission path including the continuously variable transmission 1 to transmit torque. The second clutch mechanism C2 is configured to couple the output shaft 22 to the secondary pulley 18 or the secondary shaft 21 or release the coupling. For example, as is schematically shown in FIG. 10, the second clutch mechanism C2 may be configured to couple one (particularly, a drum 18D forming a hydraulic chamber) of sheaves, which constitute the secondary pulley 18, to the driven gear 28 and release the coupling.

In the configuration shown in FIG. 10, in correspondence with the configuration that the pulleys 17, 18 having a large outside diameter are radially arranged side by side, the pair of forward-reverse switching mechanism 10 and first clutch mechanism C1 having a large outside diameter and the pair of second clutch mechanism C2 and driven gear 28 having a large outside diameter are radially arranged substantially next to each other. Therefore, it is possible to collectively arrange the large-outside-diameter members at one end in the axial direction, and the outer shape of the overall power transmission device is allowed to have a relatively short shape in the axial length of the large-diameter portion accordingly. Thus, it is possible to improve vehicle mountability accordingly.

The output shaft 22 that is the above-described cylindrical shaft is configured as follows. The output shaft 22 extends in a direction away from the secondary pulley 18. The output gear 31 is provided at the extended portion. The output shaft 22 transmits torque from the output gear 31 to the front differential 30 via the large-diameter gear 32, the speed reduction gear shaft 33, the small-diameter gear 34 and the ring gear 35. The configuration of the torque transmission path that is routed from the output gear 31 to the front differential 30 is similar to the configuration in each of the above-described specific examples like reference numerals in FIG. 10 denote not specifically described similar components to those of each of the above-described specific examples.

The power transmission device configured as shown in FIG. 10, as well as the power transmission device of each of the above-described specific examples, is able to set the forward traveling state, the predetermined speed ratio and the backward traveling state by engaging or releasing the first to third clutch mechanisms C1, C2, C3 and the brake mechanism B as shown above in FIG. 3. That is, by engaging the first clutch mechanism C1 and the third clutch mechanism C3, it is possible to transmit torque from the input shaft 9 to the output shaft 22 via the gear train 23. Because the gear ratio of the gear train 23 is larger than the maximum speed ratio of the continuously variable transmission 1, it is possible to increase driving torque at the start of the vehicle.

By engaging only the second clutch mechanism C2, torque is transmitted from the input shaft 9 to the output shaft 22 via the continuously variable transmission 1. The speed ratio in this case is changed by appropriately changing the winding radius of the belt 19 on each of the pulleys 17, 18 in the continuously variable transmission 1. In this case, torque is transmitted from the driven gear 28 integrated with the output shaft 22 to the counter drive gear 27 that is in mesh with the driven gear 28. However, the third clutch mechanism C3 is released and transmission of torque between the counter shaft 24 and the counter drive gear 27 is interrupted, so torque is not transmitted from the output shaft 22 side to the counter shaft 24. Particularly, in the case where the gear train 23 is formed as a speed reduction gear train, when torque in input from the output shaft 22 side, the gear train 23 functions as a speed increasing gear train, with the result that the rotation speed of the counter drive gear 27 becomes higher than the rotation speed of the driven gear 28. However, because the third clutch mechanism C3 is released, torque is not transmitted from the output shaft 22 side to the counter shaft 24, so the rotation speed of the counter shaft 24 does not become a high rotation speed. As a result, with the configuration shown in FIG. 10, it is possible to prevent a situation that the rotation speed of the counter shaft 24 becomes a high rotation speed in the case where the vehicle travels forward by using the continuously variable transmission 1. Therefore, it is possible to reduce a power loss at a bearing portion that supports the counter shaft 24 such that the counter shaft 24 is rotatable, and, by extension, it is possible to improve the power transmission efficiency of the power transmission device as a whole. A bearing that supports the counter shaft 24 such that the counter shaft 24 is rotatable does not particularly need to be high-grade high-cost bearing that can withstand a high rotation speed. As a result, it is possible to reduce the size and cost of the configuration of the overall power transmission device.

In the case where the vehicle travels forward by transmitting torque from the input shaft 9 to the output shaft 22 via the continuously variable transmission 1, the first clutch mechanism C1 may be engaged. In this case, torque is transmitted to the counter shaft 24 via the drive gear 25 and the counter driven gear 26 that is in mesh with the (drive gear 25, and the counter shaft 24 rotates. However, speed reduction action arises between the drive gear 25 and the counter driven gear 26, and the rotation speed of the counter shaft 24 becomes lower than the rotation speed of the input shaft 9. Therefore, there is particularly no necessity of providing a high-grade and large bearing that supports the counter shaft 24 such that the counter shaft 24 is rotatable.

The backward traveling state, as in the case of the above described specific examples, is set by engaging the brake mechanism B and the third clutch mechanism C3. That is, the ring gear 12 that is the reaction element of the forward-reverse switching mechanism 10 is fixed, and torque is input to the carrier 15 that is the input element. Thus, the sun gear 11 that is the output element is caused to rotate in a direction opposite to the direction in which the carrier 15 rotates, and, in addition, torque is transmitted from the sun gear 11 to the output shaft 22 via the gear train 23 and the third clutch mechanism C3. In this case, the configuration shown in FIG. 10 differs from each of the above-described specific examples in that the carrier 15 serves as the input element and the sun gear 11 serves as the output element. Therefore, the speed ratio of the forward-reverse switching mechanism 10 in the backward traveling state is different from the speed ratio of each of the above-described specific examples. That is, where the gear ratio of the planetary gear train that constitutes the forward-reverse switching mechanism 10 (the ratio of the number of teeth of the ring gear 12 to the number of teeth of the sun gear 11) is "$\rho$", the speed ratio of the forward-reverse switching mechanism 10 in the backward traveling state is "$(1-\rho)/\rho$" in the configuration shown in FIG. 10, while the speed ratio of the forward-reverse switching mechanism 10 in each of the above-described specific examples is "$\rho/(1-\rho)$".

Figure 11:
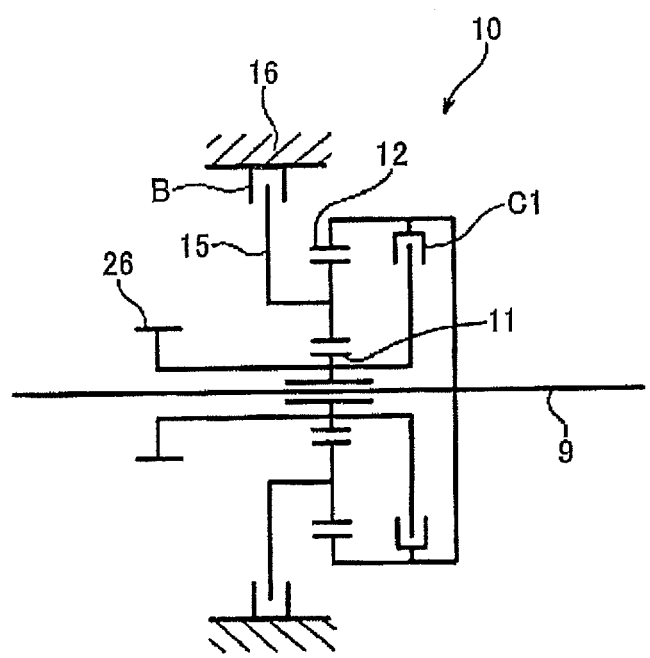
FIG. 11 is a skeletal view that shows an example of a forward-reverse switching mechanism formed of a single-pinion-type planetary gear train.

The forward-reverse switching mechanism 10 according to the invention may be formed of a single-pinion-type planetary gear train instead of the above-described double-pinion-type planetary gear train, and an example of such a configuration is shown in FIG. 11. When the single-pinion-type planetary gear train is used, the sun gear 11 serves as the output element, the carrier 15 serves as the reaction element, and the ring gear 12 serves as the input element. Thus, the carrier 15 is coupled to the brake mechanism B, and the drive gear 25 is coupled to the sun gear 11. The input shaft 9 is coupled to the ring gear 12, and the first clutch mechanism C1 is provided between the ring gear 12 and the sun gear 11. The first clutch mechanism C1 couples the ring gear 12 to the sun gear 11.

In each of the above-described specific examples, the configuration including the gear train having a single speed ratio (gear ratio) is shown. Instead, the gear train according to the invention includes a gear train that has two or more speed ratios (gear ratios) and that is able to select and set one of those speed ratios. In addition, the first clutch mechanism according to the invention is to integrate the entire forward-reverse switching mechanism that carries out differential action. Thus, as described in each of the specific examples, other than the configuration that the first clutch mechanism couples the two rotating elements, that is, the sun gear 11 and the carrier 15, to each other, the first clutch mechanism may be configured to couple the three rotating elements, that is, the sun gear 11, the carrier 15 and the ring gear 12.

In addition, in the invention, the configuration of the above-described forward-reverse switching mechanism 10 shown in FIG. 1, and FIG. 4 to FIG. 9 may be replaced with the configuration of the forward-reverse switching mechanism 10 shown in FIG. 10. That is, in the forward-reverse switching mechanism 10 shown in FIG. 1, and FIG. 4 to FIG. 9, the carrier 15 may be coupled to the input shaft 9 so as to integrally rotate with the input shaft 9, the first clutch mechanism C1 may be provided between the carrier 15 and the sun gear 11, and the sun gear 11 may be coupled to the drive gear 25 so as to integrally rotate with the drive gear 25.

DESCRIPTION OF REFERENCE NUMERALS 1 continuously variable transmission, 2 internal combustion engine (E/G), 9 input shaft, 10 forward-reverse switching mechanism, 11 sun gear, 11S sun gear shaft, 12 ring gear, 13 first pinion gear, 14 second pinion gear, 15 carrier, B brake mechanism, C1 first clutch mechanism, 17 primary pulley, 18 secondary pulley, 18D drum, 19 belt, 20 primary shaft, 21 secondary shaft, 22 output shaft, 23 gear train, 24 counter shaft, 25 drive gear, 26 counter driven gear, 27 counter drive gear, 28 driven gear, C3 third clutch mechanism, 29 sleeve, 30 front differential, 31 output gear, 32 large-diameter gear, 33 speed reduction gear shaft, 34 small-diameter gear, 35 ring gear, 36 drive shaft

The invention claimed is:

1. A power transmission device for a vehicle, the power transmission device comprising:
a continuously variable transmission provided between an input shaft and an output shaft, torque output from a driving force source being input to the input shaft, the output shaft being configured to output torque, the continuously variable transmission being configured to continuously change a speed ratio;
a gear train provided between the input shaft and the output shaft, the gear train having at least one speed ratio that cannot be set by the speed ratio of the continuously variable transmission, the continuously variable transmission and the gear train being configured to selectively transmit torque between the input shaft and the output shaft;
a forward-reverse switching mechanism arranged along a same axis as an axis of the input shaft, the forward-reverse switching mechanism being configured to carry out differential action by using three rotating elements, the three rotating elements including an input element, an output element and a reaction element of which rotation is stopped to rotate the input element and the output element in mutually opposite directions, the input element and the output shaft being selectively coupled to each other via the continuously variable transmission, the output element and the output shaft being selectively coupled to each other via the gear train;
a first clutch mechanism configured to couple at least two rotating elements among the three rotating elements;
a brake mechanism configured to stop rotation of the reaction element;
a second clutch mechanism configured to transmit or interrupt torque through a first torque transmission path that is routed from the input shaft to the output shaft via the continuously variable transmission; and
a third clutch mechanism configured to transmit or interrupt torque through a second torque transmission path that is routed from the output element to the output shaft via the gear train, the third clutch mechanism being an intermeshing clutch.

2. The power transmission device according to claim 1, wherein
the gear train is configured to set a speed ratio larger than a maximum speed ratio of the continuously variable transmission or a speed ratio smaller than a minimum speed ratio of the continuously variable transmission by using a plurality of gears.

3. The power transmission device according to claim 1, wherein
the continuously variable transmission includes a drive-side member and an output-side member, torque is transmitted from the input shaft to the drive-side member, the output-side member is configured to output torque to the output shaft, and
the second clutch mechanism is provided between the output-side member and the output shaft, the second clutch mechanism is configured to selectively couple the output-side member to the output shaft.

4. The power transmission device according to claim 1, wherein
the continuously variable transmission includes a drive-side member and an output-side member, torque is transmitted from the input shaft to the drive-side member, the output-side member is configured to output torque to the output shaft, and
the second clutch mechanism is provided between the input shaft and the drive-side member, the second clutch mechanism is configured to selectively couple the input shaft to the drive-side member.

5. The power transmission device according to claim 1, wherein
the first clutch mechanism is a friction clutch, and
the second clutch mechanism is a friction clutch.

6. The power transmission device according to claim 1, wherein
the gear train includes a drive gear, an intermediate shaft, one idle gear or multiple idle gears integrally rotating with each other, and a driven gear, the drive gear is integrally coupled to the output element, the one idle gear or each of the multiple idle gears is provided on the intermediate shaft, torque is transmitted from the drive gear to the driven gear via the one idle gear or the multiple idle gears, and the driven gear is arranged along the same axis as an axis of the output shaft, and
the third clutch mechanism is configured to couple the driven gear to the output shaft or release the drive gear from the output shaft.

7. The power transmission device according to claim 1, wherein
the gear train includes a drive gear, an intermediate shaft, one idle gear or multiple idle gears integrally rotating with each other, and a driven gear, the drive gear is provided along the same axis as an axis of the output element, the one idle gear or each of the multiple idle gears is provided on the intermediate shaft, torque is transmitted from the drive gear to the driven gear via the one idle gear or the multiple idle gears, the driven gear is arranged along the same axis as an axis of the output shaft, and the third clutch mechanism is configured to couple the output element to the drive gear or release the output element from the drive gear.

8. The power transmission device according to claim 1, wherein the gear train includes a drive gear, a driven gear, an intermediate shaft, a first idle gear, and a second idle gear, the drive gear is integrally coupled to the output element, the driven gear is arranged on the output shaft and coupled to the output shaft, the first idle gear is provided on the intermediate shaft so as to be rotatable with respect to the intermediate shaft, the first idle gear is in mesh with the drive gear, the second idle gear is provided on the intermediate shaft so as to rotate together with the intermediate shaft, the second idle gear is in mesh with the driven gear, and the third clutch mechanism is configured to couple the first idle gear to the intermediate shaft or release the first idle gear from the intermediate shaft.

9. The power transmission device according to claim 1, wherein the gear train includes a drive gear, a driven gear, an intermediate shaft, a first idle gear, and a second idle gear, the drive gear is integrally coupled to the output element, the driven gear is arranged on the output shaft and coupled to the output shaft, the first idle gear is provided on the intermediate shaft so as to rotate together with the intermediate shaft, the first idle gear is in mesh with the drive gear, the second idle gear is provided on the intermediate shaft so as to be rotatable with respect to the intermediate shaft, the second idle gear is in mesh with the driven gear, and the third clutch mechanism is configured to couple the second idle gear to the intermediate shaft or release the second idle gear from the intermediate shaft.

10. The power transmission device according to claim 1, wherein the forward-reverse switching mechanism includes a double-pinion planetary gear train, the double-pinion planetary gear train includes a sun gear, a ring gear, first pinion gears, second pinion gears, and a carrier that collectively form the input element, the output element and the reaction element, the sun gear is an external gear, the ring gear is an internal gear arranged concentrically with the sun gear, the first pinion gears are in mesh with the sun gear, the second pinion gears are in mesh with the first pinion gears and the ring gear, the carrier holds the first pinion gears and second pinion gears such that each of the first pinion gears and the second pinion gears is rotatable and revolvable.

11. The power transmission device according to claim 10, wherein the sun gear is coupled to the input shaft and the continuously variable transmission, the carrier is coupled to the gear train, and the ring gear is configured such that rotation of the ring gear is stopped by the brake mechanism.

12. The power transmission device according to claim 10, wherein the carrier is coupled to the input shaft and the continuously variable transmission, the sun gear is coupled to the gear train, and the ring gear is configured such that rotation of the ring gear is stopped by the brake mechanism.

13. The power transmission device according to claim 1, wherein the forward-reverse switching mechanism includes a single-pinion planetary gear train, the single-pinion planetary gear train includes a sun gear, a ring gear, pinion gears, and a carrier, the sun gear is an external gear, the ring gear is an internal gear arranged concentrically with the sun gear, the pinion gears are in mesh with the sun gear and the ring gear, the carrier holds the pinion gears such that each of the pinion gears is rotatable and revolvable.

14. The power transmission device according to claim 13, wherein the ring gear is coupled to the input shaft and the continuously variable transmission, the sun gear is coupled to the gear train, and the carrier is configured such that rotation of the carrier is stopped by the brake mechanism.

15. The power transmission device according to claim 1, wherein the forward-reverse switching mechanism includes a planetary gear train, the planetary gear train is expressed by a collinear diagram that represents the elements by mutually parallel lines and that indicates a rotation speed of each element by a distance from an intersection with a base line perpendicular to the parallel lines, and the reaction element is an element that is represented by the line located at a center in the collinear diagram, the input element is an element that is represented by one of the right and left lines in the collinear diagram, and the output element is an element that is represented by the other of the right and left lines in the collinear diagram.

* * * * *